United States Patent
Huang et al.

(10) Patent No.: US 6,786,823 B2
(45) Date of Patent: Sep. 7, 2004

(54) GAME KEYBOARD DEVICE

(75) Inventors: Kuang-Yu Huang, Taipei Hsien (TW); Shun-Yi Yao, Taipei Hsien (TW)

(73) Assignee: Chicony Electronics Co., Ltd., Taipei Hsien (TW)

( * ) Notice: Subject to any disclaimer, the term of this patent is extended or adjusted under 35 U.S.C. 154(b) by 0 days.

(21) Appl. No.: 10/307,872

(22) Filed: Dec. 2, 2002

(65) Prior Publication Data
US 2004/0106451 A1 Jun. 3, 2004

(51) Int. Cl.[7] .......................... A63F 13/00; A63F 9/24; G06F 17/00
(52) U.S. Cl. .......................... 463/37; 463/38
(58) Field of Search .................. 463/1, 16–39, 463/40–42; 341/20, 22; 361/680, 681; 400/473, 474; 379/110.01, 90.01; 708/109; 345/168; 82/106

(56) References Cited
U.S. PATENT DOCUMENTS 5,662,422 A * 9/1997 Fort ........................... 400/489
5,689,253 A * 11/1997 Hargreaves et al. ........... 341/22
5,825,612 A * 10/1998 Aubuchon et al. ........... 361/680
5,957,595 A * 9/1999 Chen ........................... 400/472
6,081,207 A * 6/2000 Batio ........................... 341/20
6,453,027 B1 * 9/2002 Kang et al. ............. 379/110.01
6,504,709 B2 * 1/2003 Yang et al. ................. 361/686
6,512,511 B2 * 1/2003 Willner et al. ............... 345/169
6,587,094 B2 * 7/2003 Anderson .................... 345/168

* cited by examiner

Primary Examiner—Jessica Harrison
Assistant Examiner—Robert Mendoza
(74) Attorney, Agent, or Firm—Wildman, Harrold, Allen & Dixon LLP

(57) ABSTRACT

The disclosed game keyboard device comprising: a key matrix, a direction control mechanism, and a microprocessor. A switch key is used to change the direction control mechanism between the functions of a joystick and a mouse. The game keyboard device can selectively implement the function of the joystick or mouse through a single direction control mechanism. Therefore, the hardware manufacturing cost of the game keyboard device can be considerably reduced.

21 Claims, 2 Drawing Sheets

GAME KEYBOARD DEVICE

BACKGROUND OF THE INVENTION

1. Field of Invention

The invention relates to a keyboard device. More explicitly, the invention relates to a game keyboard device that can switch between the functions of a joystick and a mouse and the configuration thereof.

2. Related Art

The keyboard and mouse are the main input peripheral devices of a personal computer (PC). The keyboard provides the data input of characters, numbers, and other setting function keys. The mouse provides the cursor control. Nowadays, PC uses have become even more popular in families to assist document and data processing and, furthermore, they provide users entertainments. However, the user often has to purchase an additional joystick device according to the requirements of various games. Such additional input peripheral devices greatly occupy the user's working space.

In order to save space, the prior art has provided various kinds of integrated input devices that combine the functions of keyboard, mouse and joystick devices. For example, there exist keyboard devices with the mouse function and keyboard devices with both the joystick and mouse functions. These integrated input devices simply provide additional mouse and joystick devices that independently implement the mouse and joystick functions. The user is able to simultaneously operate the mouse and joystick on a single keyboard device, without too much table space being occupied.

However, when a user uses a PC, he/she usually only processes one job at the same time. Even if the PC is capable of performing word processing, data processing and game software simultaneously, the user still switches the PC to implement only a single task so that the PC responds to the corresponding input device. For example, when the PC is running the Windows operating system (OS), the user can simultaneously open Microsoft Word for word processing, Microsoft Excel for data processing, and a game at the same time. However, the user must switch the OS to Microsoft Word and use the keyboard and mouse for word processing, or to the game and use the joystick to play the game. Therefore, integrating the joystick and the mouse on the keyboard is not necessary because the user often does not use the joystick and the mouse at the same time.

The invention provides a game keyboard device, which uses a switch key to switch a direction control mechanism whereby either a joystick function or a mouse function is implemented. Thus, the disclosed game keyboard device can selectively implement the joystick and mouse functions using a single direction control mechanism. Accordingly, the hardware manufacturing cost can be considerably reduced.

SUMMARY OF THE INVENTION

The primary object of the present invention is to provide a game keyboard device with a switch key to switch a single direction control mechanism whereby either a joystick function or a mouse function is implemented.

Another object of the invention is to provide a game keyboard device configuration. A smaller right portion with a direction control mechanism and mouse keys is provided on the right side of the keyboard body. A larger left portion with a plurality of game keys is provided on the left side of the keyboard body. Therefore, the right side provides the function of mouse operations, and the left side provides with convenient operation of game keys during the implementation of game software.

A further object of the invention is to provide a game keyboard device that uses a single direction control mechanism to perform joystick or mouse operations according to the needs of PC utilities.

The prior art simply install a mouse and a joystick on a keyboard, independently implementing the mouse and joystick functions, simultaneously. The mouse and joystick functions cannot be effectively integrated according to practical operation needs using the direction control mechanism in the hardware design. Therefore, the invention provides a game keyboard device that fully integrates the mouse and joystick functions in the hardware design. A switch key is provided to switch whereby either a joystick function or a mouse function is implemented. The hardware manufacturing cost of the invention is thus greatly reduced.

According to a preferred embodiment of the invention, a game keyboard device comprising a key matrix 104, a direction control mechanism 21, and a microprocessor 101. The key matrix 104 comprising 101 standard keys 13, game keys 31 for the joystick function, mouse keys 22 for the mouse function, and a switch key 11. The direction control mechanism 21 generates a direction signal according to the direction input by the user. The microprocessor 101 scans the key status of the key matrix 104 and receives the direction signal. The microprocessor 101 outputs a direction signal of the mouse pattern or joystick pattern according to the key status of the switch key 11, enabling the operation of the corresponding mouse keys 22 or game keys 31. In addition, the disclosed game keyboard device further includes: a serial interface 102 and a light-emitting diode (LED) driver 103. The serial interface 102 is electrically connected to the microprocessor 101 for transmitting the direction signal output from the microprocessor 101 to a PC host. The LED driver 103 is electrically connected to the microprocessor 101 for indicating the key status of the switch key 11 on an LED 12.

According to a preferred embodiment of the invention, the configuration of the game keyboard device comprising a body 10, a right portion 20, and a left portion 30. The body is installed with the 101 standard keys 13. The right portion 20 is connected to the right side of the body 10 and has a direction control mechanism 21 and a plurality of mouse keys 22 thereon. The right portion has a first protruding surface 23 near the direction control mechanism 21. The left portion 30 is connected to the left side of the body 10 and has a plurality of game keys 31 thereon. The left portion 30 has a second protruding surface 32. The right portion 20 is smaller than the left portion 30, and the curvature of the first protruding surface 23 is greater than that of the second protruding surface 32. The user puts the right palm on the first protruding surface to control the direction control mechanism and the left palm on the second protruding surface to control the game keys.

According to another preferred embodiment of the invention, a game keyboard device is in electrical communications with a PC host. The game keyboard device comprising a key matrix, a direction control mechanism, and a microprocessor. The key matrix comprising the standard keys, game keys for the joystick function, mouse keys for the mouse function. The direction control mechanism generates a direction signal according to the direction input by the user. The microprocessor scans the key status of the key matrix and receives the direction signal. The microprocessor outputs the direction signal and the key status to the PC host. The PC host implements a driver in response to a utility program (such as word processing or game software). The direction signal output by the microprocessor is then decoded as a mouse pattern signal or a joystick pattern signal for the utility. The key status of the mouse keys or the game keys is also enabled.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

This invention provides a game keyboard device, which integrates the functions of a mouse and a joystick. In particular, the disclosed device effectively integrates the hardware design of direction control in the mouse and joystick functions. A switch key selectively changes a direction control mechanism to implement the direction control in the joystick or mouse functions. Therefore, the hardware resources can be shared to reduce the manufacturing cost.

Figure 1:
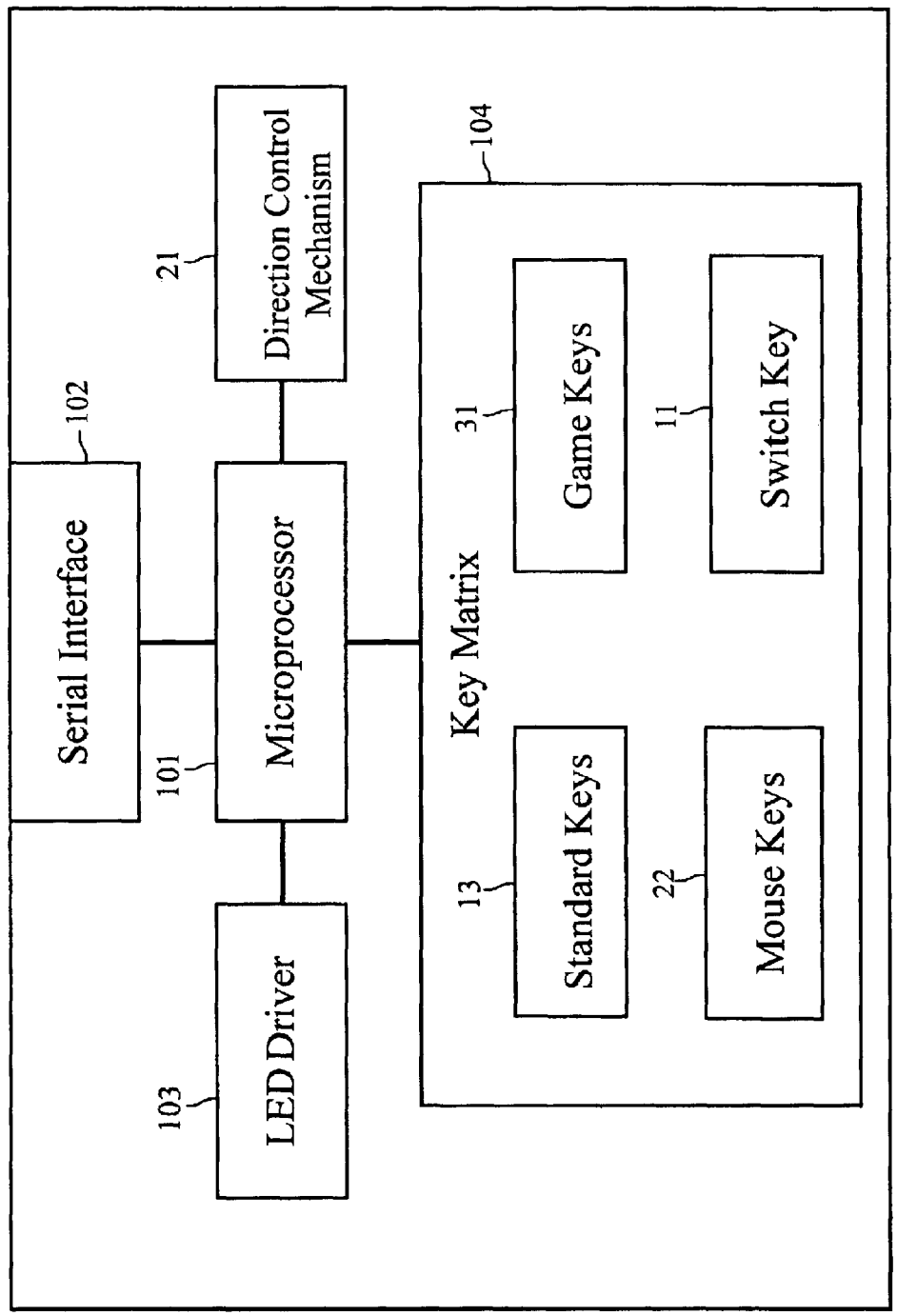
FIG. 1 is a circuit block diagram of the disclosed game keyboard device.

With reference to FIG. 1, a preferred embodiment of the circuit for the disclosed game keyboard device comprising a key matrix 104, a direction control mechanism 21, a microprocessor 101, a serial interface 102, a light-emitting diode (LED) driver 103, and a shell. The key matrix 104 at least comprising: standard keys 13, game keys 31 for the joystick function, mouse keys 22 for the mouse function, and a switch key 11. The direction control mechanism 21 generates a direction signal corresponding to the input direction control from the user. The direction signal is an analog or digital electronic signal. The microprocessor 101 scans the key status of the key matrix 104 and receives the direction signal from the direction control mechanism 21. The microprocessor 101 follows the key status of the switch key 11 to encode and output a direction signal with the mouse or joystick pattern. The corresponding mouse keys 22 or game keys 31 are enabled. The serial interface 102 is electrically connected to the microprocessor 101 for transmitting the encoded direction signal output from the microprocessor 101 to a PC host (not shown). The LED driver 103 is electrically connected to the microprocessor 101 to indicate the key status of the switch key 11 on an LED 12. The shell is installed with the standard keys 13, the game keys 31, the mouse keys 22m and the switch key 11, fixing them at respective positions.

In this embodiment of the invention, the circuit shown in FIG. 1 is implemented on a circuit board. The circuit board is placed with a microprocessor 101, a direction control mechanism, and a key matrix 104, which are in electrical communications with one another. The circuit board is installed inside the shell, and each of the keys is aligned to its designated position on the shell.

The disclosed game keyboard device is installed with a single direction control mechanism so that the user can operate this direction control mechanism as a joystick according to the requirement of game software or as a mouse according to the requirement of application software with no need to install direction control mechanism for both joystick function and mouse function simultaneously on keyboard. The cost and volume of the keyboard can be reduced. In an embodiment of the invention, the direction control mechanism can be a point joystick, a micro joystick, or a track ball that is able to generate a direction signal according to the user's direction control. The direction signal according to the design can be an analog or digital electronic signal. The electronic signal is electrically connected to input pins of the microprocessor 101.

The microprocessor 101 is a universal program controller that has an input signal pins and an output signal pins. The microprocessor 101 scans the key status of the key matrix 104 to obtain the depressing status of the keys 13, 31, 22, 11 and receives the direction signal generated by the direction control mechanism. The microprocessor 101 refers to the key status of the switch key 11 and determines to encode the received direction signal into a mouse or joystick pattern direction signal. It further enables the operational functions of the corresponding mouse keys 22 or game keys 31. The key status of the mouse keys or game keys is then sent to the PC host through the serial interface 102.

In a modified embodiment of the invention, the communications between the game keyboard device and the PC host include not only a signal cable between the serial interface and the serial port of the PC host, but also in a wireless method using a wireless interface. The mouse pattern or joystick pattern direction generated by the microprocessor 104 and the key status of the key matrix 104 are transmitted in a wireless method (e.g. infrared or RF transmissions) to the wireless receiving interface on the PC host. People skilled in the art can easily modify such variations of the invention.

Figure 2:
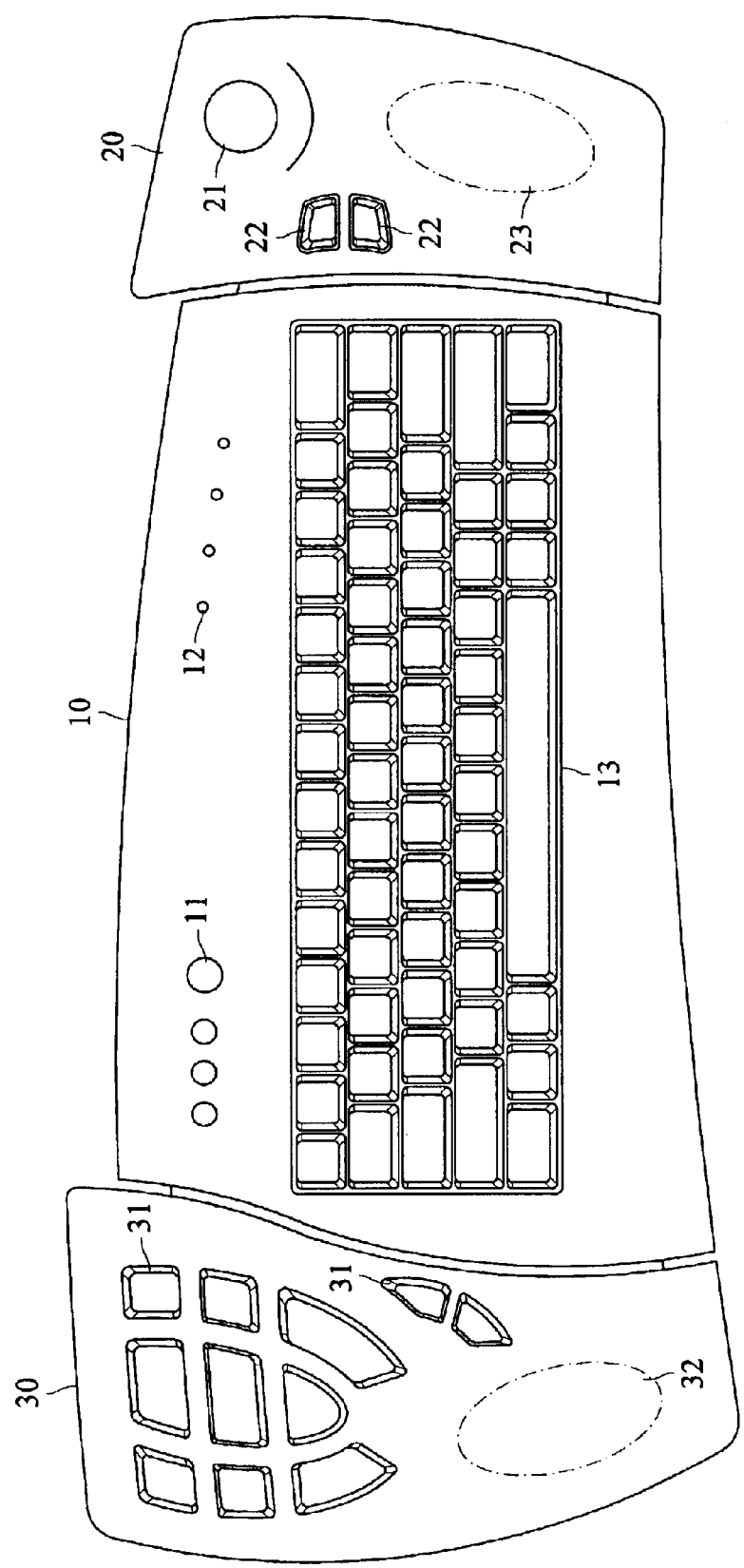
FIG. 2 is a top view of the shell configuration of the game keyboard device according to the invention.

With reference to FIG. 2, the configuration of the shell comprising a body 10, a right portion 20, and a left portion 30. The body 10 is installed with standard keys 13 comprising a plurality of character keys, a plurality of number keys, and other function keys. A switch key 11 and an LED 12 are installed near the standard keys 13. The right portion 20 is connected to the right side of the body 10. A direction control mechanism 21 and a plurality of mouse keys 22 are installed on the right portion 20. A human-mechanically designed first protruding surface 23 is provided on the right portion close to the direction control mechanism 21 for supporting the user's right palm to operate the direction control mechanism 21 and the mouse keys 22. The left portion 30 is connected to the left side of the body 10. A plurality of game keys 31 is provided on the left portion 30. A human-mechanically designed second protruding surface 32 is provided on the left portion to support the user's left palm to operate the game keys 31. It is featured in that the right portion 20 is smaller than the left portion 30 and the curvature of the first protruding surface 23 is greater than that of the second protruding surface 32. This is designed so in order for the right palm to rest on the first protruding surface, comfortably operating the direction control mechanism, and the left palm to rest on the second protruding surface, also comfortably operating the game keys.

In an embodiment of the invention, the disclosed game keyboard device is a desktop keyboard device. The user can use the right portion 20 of the keyboard to obtain the mouse function. On the other hand, the user can use the right portion 20 to control the direction and the left portion 30 to control the game keys 31 during the joystick function operation.

In another embodiment of the invention, a game keyboard device is in electrically connected to a PC host. Whether the game keyboard device is implementing the joystick function or the mouse function that is determined by a driver. The game keyboard device comprising: a key matrix, a direction control mechanism, a microprocessor, a circuit board, and a shell. The key matrix comprising standard keys, game keys for the joystick function, and mouse keys for the mouse function. The direction control mechanism generates a direction signal corresponding to the user's input direction. The microprocessor scans the key status of the key matrix and receives the direction signal, and outputs the direction signal and the key status to the PC host. The configuration of the circuit board includes the microprocessor, the direction control mechanism, and the key matrix that are electrically connected among one another. The shell has arrangement for the relative positions of the standard keys, the game keys, and the mouse keys and fixes the circuit board. In particular, the PC host runs a driver that responds to a utility program (such as word processing or game software). The driver interprets the direction signal output from the microprocessor to be a mouse pattern or joystick pattern for the utility program. The driver further enables the key status of the mouse keys and the game keys accordingly.

In this embodiment, the circuit board further provides a communication circuit with a serial interface. It is connected to the serial of the PC host through a signal cable. The circuit board can also be implemented with a communication circuit that has a wireless interface, so that the signal can be transmitted to a wireless receiver interface of the PC host in a wireless method (e.g. infrared or RF transmissions).

With the above detailed description of the invention using preferred embodiments, any person skilled in the art can clearly understand and, without departing from the scope and spirit of the following claims, make various modifications. For example, the technical features of the left portion and the right portion in the configuration of the shell can be interchanged so that a left-handed user feels more comfortable. Alternatively, the switch key that switches the direction control mechanism whereby either the joystick function or the mouse function can be implemented by a driver running on the PC host.

What is claimed is:

1. A game keyboard device, which comprises:
   a key matrix, which includes a plurality of alphanumeric keys and at least one game key;
   a single direction control mechanism, for selectively operating in one of a joystick mode and a mouse mode and for generating a direction signal corresponding to a direction control input by a user;
   a shell for receiving the plurality of alphanumeric keys, the at least one game key, and the single direction control mechanism;
   a switch key for selecting between the joystick mode and the mouse mode, the switch key being disposed on the shell; and
   a microprocessor in communication with the switch key.

2. The game keyboard device of claim 1 further comprising a serial interface for transmitting the direction signal output to a PC host.

3. The game keyboard device of claim 1 further comprising an LED driver, which is electrically connected to the microprocessor for the microprocessor to indicate a key status of the switch key on an LED.

4. The game keyboard device of claim 1, wherein the microprocessor enables the operation function of the single direction control mechanism according to a key status of the switch key.

5. The game keyboard device of claim 4, wherein the microprocessor encodes and outputs a direction signal with the mouse pattern according to the key status of the switch key and simultaneously enables the function of one or more mouse keys.

6. The game keyboard device of claim 4, wherein the microprocessor encodes and outputs a direction signal with the joystick pattern according to the key status of the switch key and simultaneously enables the function of the at least one game key.

7. The game keyboard device of claim 1, wherein the single direction control mechanism is selected from the group consisting of a point joystick, a micro joystick and a track ball.

8. The game keyboard device of claim 1, wherein the direction signal output from the single direction control mechanism is selected from an analog electronic signal and a digital electronic signal.

9. The game keyboard device of claim 1, wherein the shell has a body provided with standard keys, including a plurality of character keys, a plurality of number keys, and a plurality of function keys; wherein the switch key and the LED are installed near the standard keys.

10. The game keyboard device of claim 9, wherein the shell has a right portion connected to the right side of the body and installed with the direction control mechanism and one or more mouse keys.

11. The game keyboard device of claim 9, wherein the shell has a left portion connected to the left side of the body and installed with the at least one game key.

12. The game keyboard device of claim 1 further comprising a circuit board installed with the microprocessor, the direction control mechanism, and the key matrix that are electrically connected with one another, the circuit board being installed inside the shell.

13. A game keyboard device, which comprises:
    a key matrix comprising a plurality of alphanumeric keys and at least one game key;
    a single direction control mechanism, for selectively operating in one of a joystick mode and a mouse mode and for generating a direction signal corresponding to a direction control input by a user.

14. The game keyboard device of claim 13 further comprising a serial interface for transmitting the direction signal output to a PC host.

15. The game keyboard device of claim 13 further comprising an LED driver, which is electrically connected to a microprocessor for the microprocessor to indicate a key status of the switch key on an LED.

16. The game keyboard device of claim 13, wherein the key matrix further includes a plurality of mouse keys and a plurality of game keys.

17. The game keyboard device of claim 16, wherein a microprocessor enables the single direction control mechanism according to a key status of a switch key.

18. The game keyboard device of claim 17, wherein a microprocessor encodes and outputs a direction signal according to a key status of a switch key and simultaneously enables the function of one or more mouse keys.

19. The game keyboard device of claim 17, wherein the microprocessor encodes and outputs a direction signal with the joystick pattern according to the key status of the switch key and simultaneously enables the function of the at least one game keys.

20. The game keyboard device of claim 13, wherein the single direction control mechanism is selected from the group consisting of a point joystick, a micro joystick and a track ball.

21. The game keyboard device of claim 13, wherein the direction signal output from the direction control mechanism is selected from an analog electronic signal and a digital electronic signal.

* * * * *